US010436350B1

(12) United States Patent
Ehsani

(10) Patent No.: US 10,436,350 B1
(45) Date of Patent: Oct. 8, 2019

(54) TRENCHLESS PIPE-LAYING

(71) Applicant: Mohammad R Ehsani, Tucson, AZ (US)

(72) Inventor: Mohammad R Ehsani, Tucson, AZ (US)

( * ) Notice: Subject to any disclaimer, the term of this patent is extended or adjusted under 35 U.S.C. 154(b) by 0 days.

(21) Appl. No.: 15/974,641

(22) Filed: May 8, 2018

(51) Int. Cl.
  *E02F 5/10* (2006.01)
  *F16L 1/26* (2006.01)
  *H02G 1/06* (2006.01)
  *F16L 1/00* (2006.01)
  *F16L 11/00* (2006.01)

(52) U.S. Cl.
  CPC ............... *F16L 1/00* (2013.01); *F16L 11/00* (2013.01)

(58) Field of Classification Search
  CPC ..... E02F 5/10; F16L 1/028; F16L 1/11; F16L 1/26; F16L 55/18; F16L 55/165; H02G 1/06; E21D 9/005; E03F 2003/065
  USPC ..... 405/174, 176, 184–184.3, 150.1; 138/97, 138/98; 156/287, 294, 184, 189, 169, 156/173, 175; 264/269, 36.17, 516
  See application file for complete search history.

(56) References Cited

U.S. PATENT DOCUMENTS

| | | | | |
|---|---|---|---|---|
| 4,009,063 A | * | 2/1977 | Wood | B29C 53/36 156/71 |
| 4,273,605 A | * | 6/1981 | Ross | B08B 9/047 138/140 |
| 5,044,405 A | * | 9/1991 | Driver | F16L 55/1651 138/98 |
| 5,800,522 A | * | 9/1998 | Campbell | A61B 17/12022 128/898 |
| 6,003,606 A | * | 12/1999 | Moore | E21B 4/18 166/381 |
| 6,539,979 B1 | * | 4/2003 | Driver | F16L 55/1651 138/97 |
| 7,766,048 B2 | * | 8/2010 | Driver | F16L 55/1651 138/98 |
| 8,985,154 B2 | * | 3/2015 | Quigley | F16L 11/12 138/33 |
| 2003/0015247 A1 | * | 1/2003 | Driver | F16L 55/1654 138/98 |
| 2005/0161261 A1 | * | 7/2005 | Betts | E21B 7/067 175/61 |
| 2009/0107558 A1 | * | 4/2009 | Quigley | F16L 11/12 137/15.01 |
| 2009/0308475 A1 | * | 12/2009 | Stringfellow | B29C 63/343 138/98 |
| 2012/0145381 A1 | * | 6/2012 | Nobileau | E21B 43/103 166/242.1 |
| 2015/0023735 A1 | * | 1/2015 | Eschenbrenner | E02D 29/128 405/133 |

(Continued)

*Primary Examiner* — Benjamin F Fiorello
*Assistant Examiner* — Edwin J Toledo-Duran
(74) *Attorney, Agent, or Firm* — Arjomand Law Group

(57) ABSTRACT

Methods and systems are disclosed for laying trenchless pipes under ground. In these methods strips of fabrics saturated with resin are helically or non-helically wrapped around desired shape mandrels that are located near an entrance to an underground tunnel or an old pipe, and the partially cured pipes are lowered into the tunnel or the old pipe and is pulled by chain or cable from the other side of the tunnel or the old pipe to line the tunnel and the old pipe. One or more kinds of sensors or gauges may also be attached to or embedded in the fabrics to monitor various aspects of the pipe or the content of the pipe.

10 Claims, 3 Drawing Sheets

(56) References Cited

U.S. PATENT DOCUMENTS

2016/0053922 A1\* 2/2016 Ehsani .................... B29C 63/10
138/141

\* cited by examiner

US 10,436,350 B1

TRENCHLESS PIPE-LAYING

CROSS-REFERENCE(S) TO RELATED APPLICATION(S)

This Non-Provisional Patent Application is related to the U.S. Non-Provisional patent application Ser. No. 15/730, 689, entitled "CONTINUOUS ON-SITE MANUFACTURED CONCRETE PIPE," filed on 11 Oct. 2017 and to U.S. Non-Provisional patent application Ser. No. 15/684, 928, entitled "ONSITE REAL-TIME MANUFACTURING OF LONG CONTINUOUS JOINTLESS PIPES," filed on 23 Aug. 2017, the disclosures of both of which are hereby expressly incorporated by reference in their entirety.

TECHNICAL FIELD

This application relates generally to laying trenchless pipes. More specifically, this application relates to a method for on-site construction of continuous FRP pipes and laying them inside tunnels or other pipes.

BRIEF DESCRIPTION OF THE DRAWINGS

The drawings, when considered in connection with the following description, are presented for the purpose of facilitating an understanding of the subject matter sought to be protected.

DETAILED DESCRIPTION

While the present disclosure is described with reference to several illustrative embodiments described herein, it should be clear that the present disclosure should not be limited to such embodiments. Therefore, the description of the embodiments provided herein is illustrative of the present disclosure and should not limit the scope of the disclosure as claimed. In addition, while the following description references using FRP (Fiber Reinforced Polymer) to construct the underground pipes, it will be appreciated that the disclosure may include other curable and other reinforcement materials such as resin and various non-metallic or plastics such as HDPE, PVC, rubber, etc., to which the disclosed methods also apply. Furthermore, these methods may be utilized to construct new pipes inside old or damaged and corroded pipes, culverts, tunnels, and the like.

The disclosed methods teach the on-site manufacturing of lower cost, safer and environmentally sustainable pipes using the FRP technology. The example pipes in this specification are basically made of layers of FRP straps wrapped around a mandrel situated close to the tunnel or the duct in which the pipe enters and resides. The pipe industry in the United States is approximately $68 Billion annually. Underground pipes typically account for around 30% of the total project cost. An objective of this innovation is to reduce that number to around 10% of the total project cost. This, for example, would enable municipal owners to stretch their limited capital expenditure budgets and to better address their aging water and sewer infrastructure.

Figure 1:
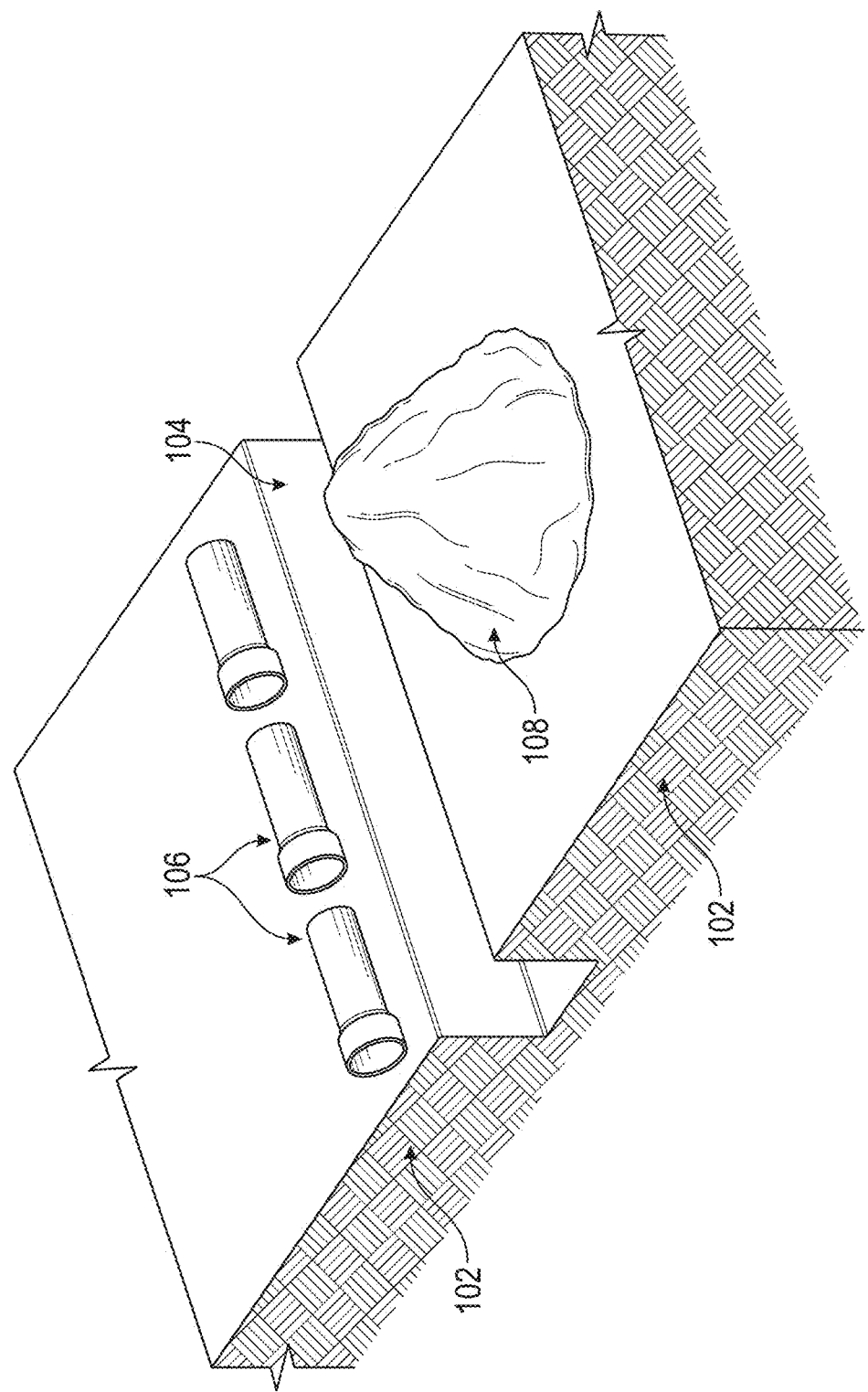
FIG. 1 shows traditional method of laying pipes in an open trench.

The traditional construction of a pipeline, as partly illustrated in FIG. 1, has remained virtually unchanged since its inception and includes the following steps:

1. Cut a trench 104 in the ground 102 for placement of the pipe
2. Pipe segments 106 are constructed in short segments in factories
3. Ship the pipe segments 106 via trucks to the jobsite
4. Unload the pipe segments 106 along the trench 104
5. Place and join the pipe segments 106 in the trench 104
6. Backfill and compact the trench 104 with appropriate fill material
7. Haul away the excess soil 108 from the site for disposal
8. Re-pave the surface above the trench or otherwise restore it to its original condition The traditional method of pipeline construction is even more troublesome when the pipe path crosses through highways, streets or bodies of water, to name a few. In these situations it will be very helpful if there were no need for digging an open trench and interfering with the daily life. Another major problem with the traditional method of pipeline construction is the storage of the pipe segments especially in crowded areas. Again, unfortunately, the traditional method is to leave pipe segments on the side of the streets until they are being used and being laid within the trenches. This disturbs the traffic and is a nuisance for any neighborhood.

Figure 2:
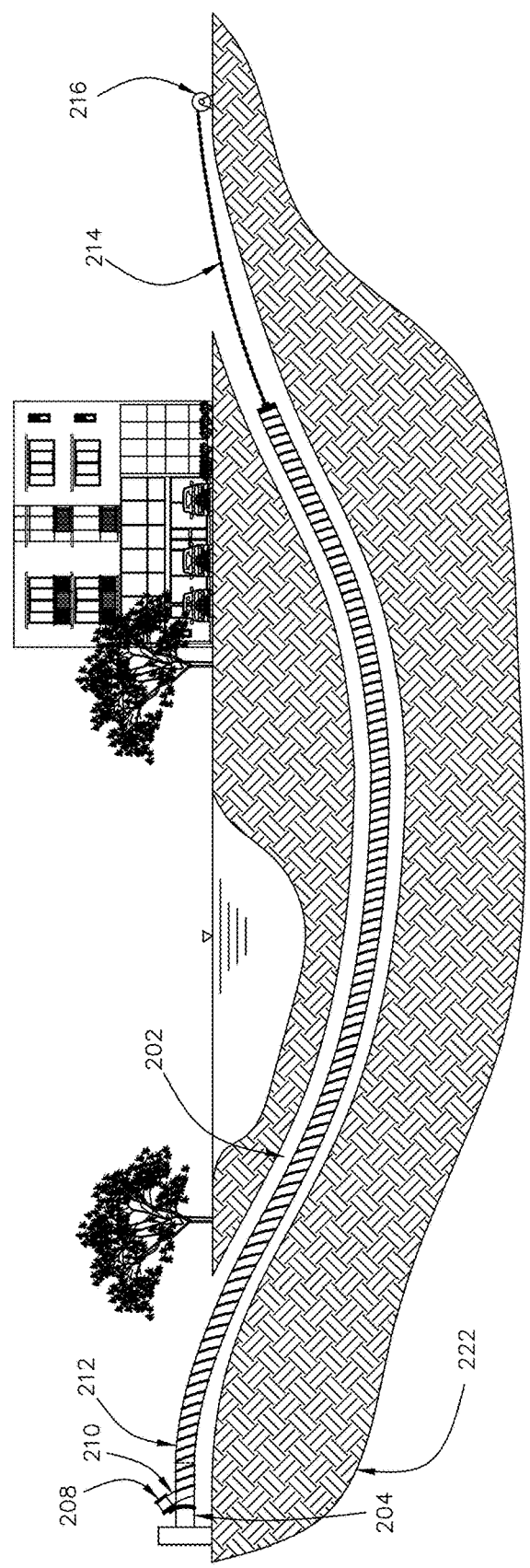
FIG. 2 illustrates an example view of a jointless pipe being manufactured onsite while being pulled inside a tunnel, according to an example embodiment of the present disclosure.

Briefly explained, the new method, as schematically illustrated in FIG. 2, includes boring a tunnel 202 in the ground 222 or using an existing damaged pipe 202 in the ground 222. In this example embodiment, a mandrel 204 having an outside diameter equal to the internal diameter of the pipe 212 (to be manufactured) is placed near one end of the tunnel 202. Various layers of resin-saturated carbon or glass FRP fabric 210 are wrapped helically or non-helically (in overlapping individual bands) around the mandrel 204. The fabric strip 210, in some embodiments, may be unwound from one or more spools 208 that can revolve around mandrel 204. In one embodiment the resin can cure very fast (in about 3 minutes) at a temperature of 300 F. This allows the wrapped FRP layers to become a hard pipe 212 in a few minutes.

In some embodiments additional strips of reinforcement materials may be longitudinally placed between the wrapped layers of the pipe 212. In other embodiments sheets of reinforcement materials may be wrapped, non-helically between, under, and/or over the wrapped layer(s) of the pipe 212. In some embodiments there may not be any other wrappings except for these non-helical wrappings of these sheet materials. Such non-helically wrapped sheets of reinforcement materials may overlap each other along the longitudinal axis of the pipe 212. In all the overlapping wrappings, helical or non-helical, the percentage of the overlap is calculated and adjusted at least based on the material and the required strengths of the pipe 212.

The formed pipe 212 is subsequently slipped off the tapered or non-tapered mandrel 204 into the tunnel 202, but the upper end of the pipe 212 is kept on the mandrel 204. The process of wrapping layers of FRP 210 continues and is repeated for as long as it is needed to create a continuous pipe 212 of desired length.

While the pipe 212 is lowered into the tunnel 202, its lower end is, for example, connected to a cable/chain 214 and is pulled from the other side of tunnel 202. The cable 214 and pipe 212 are controllably pulled into the tunnel 202, for example, by stepping motor 216. Cable 214 helps to gradually and completely pull the pipe 212 into and through the tunnel 202, where the rate of pulling is substantially the same as the rate of formation of pipe 212.

Depending on the method of the formation of the pipe 212, the pulling of the pipe 212 into the tunnel 202 may be continuous or in steps. For example the pipe 212 may be continuously pulled as the strip 210 is being wound around mandrel 204 or the pipe 212 is only lowered and pulled if the entire length of mandrel 204 is wound around. In the latter case the spool 208 may also travel back and forth on the mandrel 204. In the former case the turning of the spool 208 around the mandrel 204 and the pulling of the cable 214 may be synchronized and the faster the strip 210 is wound around mandrel 204, the faster the pipe 212 is pulled into the tunnel 202.

Directions of the fibers of the strip 210 and/or the additional longitudinal strips provided between the wrapped strips provide the additional needed strength will the pipe 212 is being pulled. In some embodiments oils, bentonite or other lubricants may be used to ease the movement of pipe 212 within tunnel 202. In some embodiments after the pipe 212 is laid as desired, the gap between the pipe 212 and the tunnel/pipe 202 is filled with filler materials such as grout, concrete, or resin and the like.

In one embodiment the newly wound pipe segment can be resting on the mandrel while it is cured and then partially slipped off. In another embodiment, the process will be continuous without a substantial pause such that as the FRP layers are being wrapped in one part of the mandrel, the wrapped portion on another part of the mandrel is being cured.

In various embodiments the FRP layers can be manually wrapped around the mandrel. Workers can stand along the length of the mandrel and wrap the FRP around the mandrel. Multiple crews may be used simultaneously and be responsible for wrapping a certain length of the mandrel. In embodiments in which the wrapping is done mechanically, the process of the wrapping may be preprogrammed and the number of layers and the layer materials at each location along the pipe may be automatically controlled according to the program.

In various embodiments, the heating of the pipe and mandrel for curing of the resin can be done from outside or inside using light, UV rays, heat, electrical current, chemical reaction, gas, etc. It is also possible to modify the resin, for example by introducing carbon nanotubes or other products, such that when an electrical current is introduced, the resin heats up and cures rapidly.

The technique discussed here is very fast and if a 20-ft long mandrel is used, it can produce 20 feet of pipe in roughly 5 minutes, 1 minute to wrap the FRP around the mandrel, 3 minutes to cure the resin and another minute to pull the finished segment into the tunnel. That is a production rate of 4 feet per minute. So, a 1000-foot-long pipe can be made in approximately 250 minutes or 4.5 hours. The advantage of this system is that this time includes both the construction and placement of the pipe—starting from scratch.

In some embodiments the resin used in this technique is cured when exposed to UV light. Some resins in this category can cure in seconds. The curing of the pipe can be done while the pipe is on the mandrel or after the pipe is removed from the mandrel. For example, a string of UV lights can be placed inside the tunnel entrance or attached as an extension to the free end of the mandrel and when the pipe is pulled into the tunnel, the curing will continue or begin inside the tunnel.

In various embodiments, the pipe construction may include spacer materials such as 3D fabric, Coremat®, foam, or other products placed between or under or on top of the layers of FRP for additional rigidity (or increased ring stiffness). Another spacer material is Bulkermat+BSP that has been developed jointly by Toyobo Inc., Toyo Cloth Co., Ltd., and Japan U-PICA Co., Ltd. and uses micro balloons to fill the space between polyester fibers. Those skilled in the art realize that the ability of a pipe to resist external loads is proportional to its ring stiffness. When these 1000-ft pipes are inserted into a tunnel, often times the annular space between the pipe and the tunnel is filled with grout or concrete. The weight of the wet grout exerts high pressures on the outside of the pipe. Moreover, the weight of the soil above as well as other live loads such as traffic, buildings, etc. place additional load on the pipe that can potentially buckle and damage the pipe. Therefore, a pipe with high ring stiffness must be designed and constructed.

Figure 3:
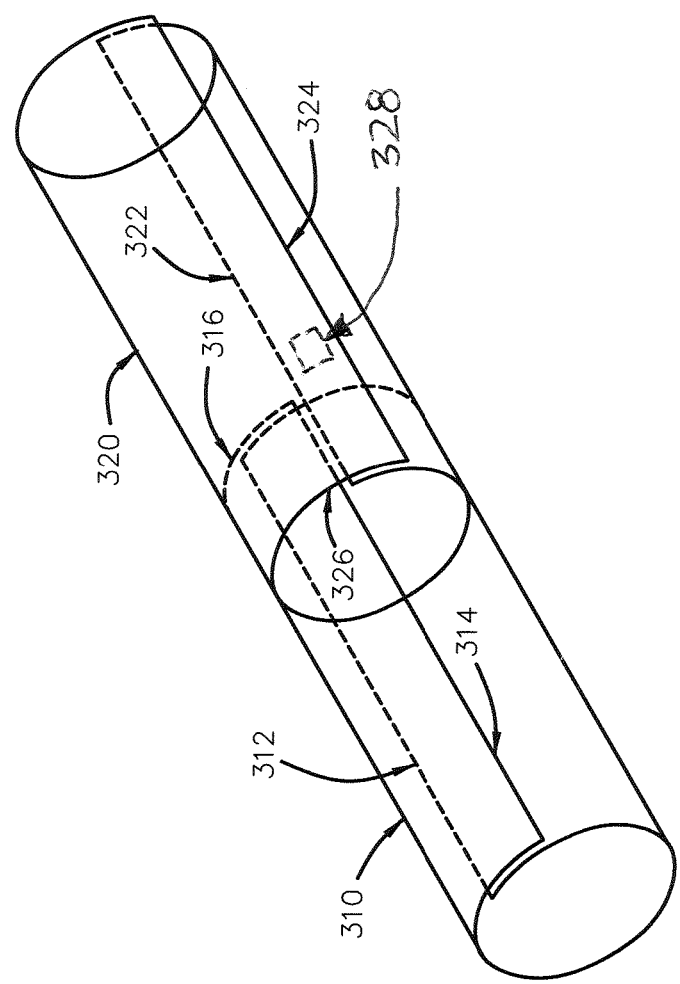
FIG. 3 illustrates an example non-helical wrapping of reinforced sheets of materials, according to another example embodiment of the present disclosure.

FIG. 3 illustrates a non-helical wrapping of reinforced sheets of materials, according to another example embodiment of the present disclosure. Layers wrapped with this method may be in addition to the layers wound helically or instead of them. As seen in FIG. 3, sheet 310 is a simple, for example, rectangular FRP that has been wound non-helically. In preferred embodiments the two sides 312 and 314 are overlapped and adhered together for additional strength. To continue this process the FRP sheet 320 is also wrapped around the mandrel non-helically with its two sides 322 and 324 overlapping. In some embodiments to add to the longitudinal strength of the pipe, the two ends 316 and 326 are also overlapped and adhered together. In other embodiments the sides and/or the ends may be butt-joined, butt-joined with a patch laid over the butt-joint, or connected by other means.

The internal and external pressure exerted on the pipe are functions of the depth as well as the external loads. In other words, the loads acting on the pipe may vary along the length of the pipe. For example, the portion of the pipe being directly below a roadway is subjected to higher loads than the regions near the two ends of the tunnel (the entrance and exit points). When pre-manufactured pipes are used, all of the pipe segments will have the same strength. Therefore, after installation, the pipe segments buried under the roadway will be more highly stressed (a lower factor of safety against failure) compared to the pipe segments near the ground or ends of the tunnel that are less stressed (resulting in a higher factor of safety). This is a waste of materials; civil engineers prefer to have designs that have a uniform factor of safety (or probability of failure). Modern building and bridge codes have been calibrated to produce a uniform factor of safety throughout the structure. One of the advantages of the technique presented here is that in some embodiments the number of layers of materials being wrapped around the mandrel can be easily changed along the length of the pipe. For example, it is very easy to build a pipe where the end portions of the pipe have 4 layers (wraps) of FR fabric, and the number of these wraps increases to 8 wraps of FRP fabric in the regions of the pipe below the roadway. This approach brings significant savings to the cost of the pipes for the project. The calculations for the number of layers of FRP must be performed by an engineer familiar with these products.

Similar to what was introduced in the above paragraph, the regions of the pipe that will be placed adjacent to, for example, an aquifer, lake or river may require a more robust design to make sure no chemicals or sewage leak and contaminate the water. This can be easily achieved by adding one or more layers of FRP fabric to the pipe over the zone adjacent to the lake or river.

In some installations the pipe is required to be strong enough in the longitudinal direction in order to be pulled through a long tunnel. The axial load on the pipe will be largest near the head of the pipe from where the pipe is being pulled and it reduces to nearly zero at the tail of the pipe, where it disengages the mandrel. Engineers can design the required amount of fibers aligned along the length of the pipe to resist these loads. One advantage of the disclosed method and system is that the amount and/or the direction of these fibers can vary along the length of the pipe to achieve the optimum strength at each elevation with little waste of materials.

When unidirectional fabric is wrapped around the mandrel, the angle of the wrapping of the fabric will allow engineers to calculate the component of the force resisted by the fabric in the hoop and longitudinal directions. Similarly if a biaxial fabric with fibers in zero and ninety degree orientation is used, engineers can calculate the strength of the pipe in longitudinal and hoop directions. By changing the angle of the helically-wrapped fabrics along the length of the pipe and the number of wraps or the amount of overlap of each consecutive layer of fabric, the strength of the pipe can be modified along its length.

In some embodiments additional strips of FRP fabric can be placed along the length of the mandrel with the fibers aligned with the axis of the pipe. These fabrics contribute to the axial strength of the pipe that carries the weight of the pipe. The number of these strips can vary along the length of the pipe to achieve the optimum weight-carrying strength for the pipe.

A further advantage of this system is that the outside diameter of the pipe can be cylindrical with no bulges. This allows for the boring of a smaller diameter tunnel and less grout to be injected in the annular space, both of which reduce the cost of the project.

Immediate cost saving is realized due to elimination of transportation of the pipes to the jobsite. Additional savings are also obtained from elimination of the cost of storage of the pipes, which results from the on-site manufacturing of the pipes. A further advantage of the proposed pipe is in congested and developed areas. The cutting of open trenches and the associated traffic control required by the current technology add significant costs to each project. In some cases, for example when a pipe must be placed under a developed city block, it is even impossible to cut a trench under existing buildings for placement of the new pipe.

In some embodiments, the applied FRP sheets can be designed to provide the entire reinforcing element for the pipe. Such FRP sheets can be placed as an internal layer within the finished thickness of the pipe or as an external layer that will come in contact with the fluids when the pipe is in service. The FRP sheets can include fibers in various x, y, and z directions (in plane and out of plane).

In some embodiments, a layer of paint or epoxy or other coatings such as polymers, polyurea, tar, etc. can be applied to the finished surface of the pipe to seal it against moisture intrusion and to also provide a smooth finished surface with minimal friction. Those experienced in the field realize that a smooth pipe surface is preferred for better flow and reduction of losses in the pipe. In other embodiments, this coating can be selected from a group of coatings that meet the NSF-61 Standards for potable pipes to ensure that the finished pipe meets the health and safety standards for drinking water. Yet in other embodiments, for example when the pipe is used to transport oil and/or gas, this coating can protect the pipe materials from chemical attack from the oil and gas.

In some embodiments various sensors or gauges 328 (FIG. 3) can be attached to or embedded in, over, or under the skin of the pipe as it is being manufactured. These sensors will allow monitoring of the stresses in the pipe during its service life and can alert the operators to any impending failure. Similarly, these sensors can be used to monitor the quality of the water by remote chemical analysis of the fluids passing through the pipe. For example, such sensors can detect any chemicals or poison introduced into the water by terrorists.

Changes can be made to the claimed invention in light of the above Detailed Description. While the above description details certain embodiments of the invention and describes the best mode contemplated, no matter how detailed the above appears in text, the claimed invention can be practiced in many ways. Details of the system may vary considerably in its implementation details, while still being encompassed by the claimed invention disclosed herein.

Particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the claimed invention to the specific embodiments disclosed in the specification, unless the above Detailed Description section explicitly defines such terms. Accordingly, the actual scope of the claimed invention encompasses not only the disclosed embodiments, but also all equivalent ways of practicing or implementing the claimed invention.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B," and also the phrase "A and/or B" will be understood to include the possibilities of "A" or "B" or "A and B."

The above specification, examples, and data provide a complete description of the manufacture and use of the composition of the invention. Since many embodiments of the invention can be made without departing from the spirit and scope of the invention, the invention resides in the claims hereinafter appended. It is further understood that this disclosure is not limited to the disclosed embodiments, but is intended to cover various arrangements included within the spirit and scope of the broadest interpretation so as to encompass all such modifications and equivalent arrangements.

While the present disclosure has been described in connection with what is considered the most practical and preferred embodiment, it is understood that this disclosure is not limited to the disclosed embodiments, but is intended to cover various arrangements included within the spirit and scope of the broadest interpretation so as to encompass all such modifications and equivalent arrangements.

What is claimed is:

1. A method of laying a trenchless underground jointless pipe that is manufactured onsite, the method comprising:
   providing a tunnel or a passage, radially larger than the jointless pipe, through which the jointless pipe is laid;
   placing a cantilevered mandrel close to an end of the tunnel or the passage;
   wrapping, helically or non-helically, one or more layers of a strip of or a sheet of reinforced material around the cantilevered mandrel, wherein the wrapped strip or the wrapped sheet of reinforced material forms a segment of the jointless pipe around the cantilevered mandrel and wherein the pipe segment is substantially cured on the cantilevered mandrel;
   lowering at least a part of the pipe segment into the tunnel or the passage, by pulling the pipe segment through the tunnel or the passage by a chain or a cable that is being pulled from another end of the tunnel or of the passage, such that a part of the pipe segment remains on the cantilevered mandrel; and
   repeating the wrapping and the lowering and the pulling steps as many times as necessary to fabricate as many pipe segments as necessary to line a desired length of the tunnel or the passage, wherein the pipe segments are all attached to each other and form the jointless pipe and wherein the jointless pipe does not change radial shape or dimension.

2. The method of claim 1, wherein the cantilevered mandrel is slightly tapered.

3. The method of claim 1, wherein each pipe segment is comprised of more than one layer of wrapping.

4. The method of claim 1, wherein wrappings are performed manually or mechanically.

5. The method of claim 1, wherein number of the wrapped layers is increased or decreased at different locations along the jointless pipe to achieve different desired strengths.

6. The method of claim 1, wherein longitudinal strips are added to the wrapped layers to strengthen the jointless pipe longitudinally.

7. The method of claim 1, wherein wrappings are performed mechanically and are preprogrammed.

8. The method of claim 1, wherein the strip of or the sheet of reinforced material is fiber reinforced polymer (FRP) and fibers of the FRP are arranged uni-directionally or multi-directionally or three-dimensionally.

9. The method of claim 8, wherein an orientation of the fibers of the FRP are predetermined for desired strengths of the jointless pipe.

10. The method of claim 1, wherein resin used during the wrapping step is at least partially cured before the pipe segment is lowered into the tunnel or the passage.

* * * * *